US 6,751,680 B2

(12) United States Patent
Langerman et al.

(10) Patent No.: US 6,751,680 B2
(45) Date of Patent: *Jun. 15, 2004

(54) PROTECTED CONTROL OF DEVICES BY USER APPLICATIONS IN MULTIPROGRAMMING ENVIRONMENTS

(75) Inventors: Alan B. Langerman, Watertown, MA (US); David A. Ford, Waban, MA (US)

(73) Assignee: Network Appliance, Inc., Sunnyvale, CA (US)

(*) Notice: Subject to any disclaimer, the term of this patent is extended or adjusted under 35 U.S.C. 154(b) by 139 days.

This patent is subject to a terminal disclaimer.

(21) Appl. No.: 10/082,663

(22) Filed: Feb. 25, 2002

(65) Prior Publication Data

US 2002/0083224 A1 Jun. 27, 2002

Related U.S. Application Data

(63) Continuation of application No. 09/275,203, filed on Mar. 24, 1999, now Pat. No. 6,360,282.
(60) Provisional application No. 60/079,356, filed on Mar. 25, 1998.

(51) Int. Cl.[7] .............................. G06F 13/14; G06F 3/00
(52) U.S. Cl. .............................. 710/3; 710/129; 713/200
(58) Field of Search .......................... 710/3, 4, 33, 39, 710/52, 73, 74, 129; 709/229, 238; 711/1–6, 100, 121, 200, 203; 713/200; 714/5, 25

(56) References Cited

U.S. PATENT DOCUMENTS

| | | | | |
|---|---|---|---|---|
| 4,161,024 A | * | 7/1979 | Joyce et al. | 711/121 |
| 5,301,287 A | | 4/1994 | Herrell et al. | 395/400 |
| 5,386,525 A | | 1/1995 | Noack | 395/400 |
| 5,598,531 A | | 1/1997 | Hill | 395/186 |
| 5,604,887 A | | 2/1997 | Naidu et al. | 395/500 |

(List continued on next page.)

OTHER PUBLICATIONS

Pratt, I.A., "User–Safe Devices for True End–to–End QoS" University of Cambridge Computer Laboratory, Cambridge, United Kingdom, Date Unknown.

(List continued on next page.)

*Primary Examiner*— Thomas Lee
*Assistant Examiner*— Thuan Du
(74) *Attorney, Agent, or Firm*—Weingarten, Schurgin, Gagnebin & Lebovici LLP

(57) ABSTRACT

A user program directly accesses a storage device for I/O operations, bypassing the operating system. The user registers a virtual memory region and an "extent", or region, of the storage device with a host bus adapter. A virtual interface is created between the user and the storage device including a queue for transmitting commands from the user to the storage device. To perform I/O, the user creates a descriptor including command information identifying the type of I/O operation, a buffer handle identifying the registered virtual memory region, virtual memory address information identifying the locations of data buffers in the registered virtual memory region to be used for the I/O operation, an extent handle identifying the registered extent, and disk address information identifying an area within the registered extent to or from which data is to be written or read. The user posts this descriptor to the virtual interface by placed it on the associated queue.

The adapter reads the descriptor and verifies that the descriptor and the data buffers are located within the registered virtual memory region identified by the buffer handle. The adapter also verifies that the area on the storage device identified by the disk address information is within the registered extent identified by the extent handle. If both of these verification steps succeed, then the I/O command is forwarded to the storage device. If either verification step fails, then the command is not forwarded, and an indication of the failure is returned to the user or the operating system.

6 Claims, 8 Drawing Sheets

U.S. PATENT DOCUMENTS

| | | | | |
|---|---|---|---|---|
| 5,655,146 | A | | 8/1997 | Baum et al. ................ 395/825 |
| 5,668,971 | A | | 9/1997 | Neufeld ...................... 711/111 |
| 5,682,428 | A | | 10/1997 | Johnson ....................... 380/23 |
| 5,694,582 | A | | 12/1997 | Pearce ......................... 395/500 |
| 5,765,206 | A | * | 6/1998 | Hohensee et al. .......... 711/203 |
| 6,044,415 | A | * | 3/2000 | Futral et al. .................. 710/33 |

OTHER PUBLICATIONS

Pratt, I.A., "The User Safe Device I/O Architecture" Ph.D. Dissertation, Kings College, University of Cambridge, United Kingdom, Aug. 1997.

Finn et al., "NVD Research Issues and Preliminary Models" University of Sourthern California Information Sciences Institute, pp 1–9 1995.

von Eicken et al., "U–Net: A User–Level Network Interface for Parallel and Distributed Computing" Proc. $15^{th}$ ACM Symposium on Operating Systems Principles, Colorado, pp 1–14 Dec. 1995.

Horst Robert, W., "TNet: A Reliable System Area Network" IEEE pp 37–45 Feb. 1995.

Murayama et al., "A Study of High–Performance Communication Mechanism for Multicomputer Systems" IEEE pp 76–83 1996.

Blumrich et al., "Protected, User–Level DMA for the SHRIMP Network Interface" Department of Computer Science, Princeton University, Publication Date Unknown.

Minnich et al., "The Memory–Integrated Network Interface" IEEE pp 11–20 Feb. 1995.

Basu et al., "Incorporating Memory Management into User–Level Network Interfaces" Department of Computer Science, Cornell University, Draft submitted for publication 1996.

Buzzard et al., "An Implementation of the Hamlyn Sender–Managed Interface Architecture" Proc. $2^{nd}$ Symposium on Operating Systems Design and Implementation, Seattle, Washington, Oct. 1996.

Buzzard et al., "Hamlyn: A High–Performance Network Interface with Sender–Based Memory Management" Computer Systems Laboratory, Hewlett–Packard Laboratories Technical Report, Palo Alto, CA, Jul. 1995.

Mummert et al., "Fine Grain parallel Communication on General Purpose LANs" ACM ICS, pp 341–349 1996.

Druschel et al., "Experiences with a High–Speed Network Adaptor: A Software Perspective" SIGCOM London, England, pp 2–13 1994.

Osborne et al., "DART—A Low Overhead ATM Network Interface Chip" In Proceedings of Hot Interconnects IV: A Symposium on High Performance Interconnects, Stanford University, Palo Alto, California, Aug. 15–17, 1996.

Karamcheti et al., "A Comparison of Architectural Support for Messaging in the TMC CM–5 and Cray T3D" In Proceedings of ISCA, Santa Margherita, Italy, Jun. 22–24, 1995.

Damianakis et al., "Client–Server Computing on Shrimp" IEEE pp 8–18 Jan./Feb. 1997.

Welsh et al., "ATM and Fast Ethernet Network Interfaces for User–Level Communication" IEEE In Proceedings of the Third International Symposium on High Performance Computer Architecture, Feb. 1–5, San Antonio, Texas pp 1–11 1997.

Dittia et al., "The APIC Approach to High Performance Network Interface Design: Protected DMA and other Techniques" IEEE Proceedings of INFOCOM Apr. 7–11 1997.

Von Eicken et al., "Active Messages: A Mechanism for Integrated Communication and Computation", Proceedings of the $19^{th}$ International Symposium on Computer Architecture, ACM Press, May 1992.

Mainwaring et al., Active Messages: Organization and Applications Programming Interface, pp 1–18 Nov. 1995.

Schauser et al., "Active Messages Implementations for the Meiko CS–2" Department of Computer Science, University of California pp 1–19, Publication Date Unknown.

Grimm, R., "Exodisk: Maximizing Application Control Over Storage Management" Thesis submitted to the Department of Electrical Engineering and Computer Science, Masachusetts Institute of Technology, May 1996.

* cited by examiner

PROTECTED CONTROL OF DEVICES BY USER APPLICATIONS IN MULTIPROGRAMMING ENVIRONMENTS

CROSS REFERENCE TO RELATED APPLICATIONS

This application is a continuation and claims priority under 35 U.S.C. §120 of U.S. patent application Ser. No. 09/275,203 filed Mar. 24, 1999, now U.S. Pat. No. 6,360,282, which claims priority under 35 U.S.C. §119(e) of provisional patent application 60/079,356, filed Mar. 25, 1998.

STATEMENT REGARDING FEDERALLY SPONSORED RESEARCH OR DEVELOPMENT

Not Applicable.

BACKGROUND OF THE INVENTION

The present invention is related to the field of computer systems, and more particularly to the processing of input/output (I/O) requests to storage devices in computer systems.

Traditionally, in robust operating system environments, the direct manipulation of an interface to one or more storage devices such as disk drives has been reserved for a software module known as a "device driver" that resides in a base of trusted operating system code. The device driver is designed to obey all the requirements of the operating system and the device for which it is responsible. In these systems, an application program makes I/O requests to the operating system, which in turn sends commands to the device via the device driver. Among other functions, the device driver and operating system detect and reject improper requests. Thus, an I/O request from an application is verified and handled in a manner that guarantees correct behavior for the operating system and the device.

Permitting application programs to directly access a device has been viewed as unsafe, because application programs can inadvertently or maliciously operate the device in a manner causing damage to the device, to other application programs, or to the operating system. An improperly programmed device can read from memory for which an application program lacks sufficient privilege, or overwrite critical sections of memory, such as operating system code or another user's data. Thus, a device can be used, accidentally or maliciously, to obtain privileged data; to corrupt or destroy data; to deny service to other applications; or to crash the entire system. For this reason, device drivers tend to become part of the trusted code base of the operating system, and application programs are forced to perform I/O via the operating system and the trusted device driver in the manner described above.

Another reason for embedding device drivers in the operating system is to present uniform interfaces to applications, free of the details and vagaries of the various types of devices that an application program may rely on. This feature may be referred to as "abstraction" of the devices. The use of abstracted interfaces enables application programmers to concentrate on the important application-specific features of the program, rather than the mechanics of storing and retrieving data from myriad storage devices.

Unfortunately, the traditional paradigm of routing all application program I/O requests through the operating system comes with a performance penalty. Typically, numerous steps are performed between the time an application program makes an operating system call and the time that the desired I/O request is actually posted to a device. These steps can include the following:

Crossing a hardware protection boundary

Saving state for the calling program

Invoking a system call handler

Copying arguments across the hardware protection boundary

Invoking generic device request code

For small amounts of data, copying the data across a hardware protection boundary For large amounts of data, locking down portions of the calling program's virtual memory, and translating virtual addresses into physical addresses usable by the device Invoking device request code in the device driver Returning through various software layers and across the hardware protection boundary to the calling program The execution of so many steps consumes valuable system resources such as CPU time, and affects the performance of the application program, as measured for example by latency or throughput (I/O operations or instructions per second). The performance impact is of course more significant for those application programs that are I/O intensive, such as for example real-time video applications or large database applications.

It would be desirable to improve the I/O performance of application programs without sacrificing the protection and abstraction benefits of the traditional I/O paradigm.

BRIEF SUMMARY OF THE INVENTION

In accordance with the present invention, a technique by which an application program directly accesses a storage entity such as a disk in a safe manner is disclosed. This "safe device" access technique enables the application program to bypass the operating system and the device driver for data transfers, resulting in increased performance. The safe device access technique employs an abstracted device interface, as well as protection features to prevent an application program from accidentally or purposely damaging other application programs or other elements of the computer system. The safe device access technique also supports so-called "legacy" application programs and devices by using mediation components that provide translation to and from existing programming and device interfaces.

In the disclosed technique, both a virtual memory region allocated for use by the application program and an "extent", or region, of a storage entity to be accessed by the program are registered with a host bus adapter via which the storage entity is accessible. A virtual interface between the application program and the storage entity is then created. The virtual interface includes a queue for transmitting commands from the application program to the storage entity.

When the application program is to perform an I/O request, the program creates one or more data buffers in the registered virtual memory region, the data buffers being allocated for storing either read or write data associated with the command. The application program also creates a descriptor which contains command information identifying the I/O operation to be performed by the storage entity, virtual memory address information identifying the locations of the data buffers in the registered virtual memory region, and storage address information identifying an area within the registered extent to or from which data is to be written or read in accordance with the I/O operation. The application program then posts the descriptor to the virtual interface, by placing the descriptor on the associated queue.

The adapter monitors all virtual interfaces to determine whether their queues contain any posted descriptors. Upon finding a posted descriptor, the adapter verifies that the descriptor and the data buffers identified by the virtual memory address information are located within the registered virtual memory region. The adapter also verifies that the area on the storage entity identified by the storage address information in the descriptor is within the registered extent. If both of these verification steps are successful, then a command for the I/O operation is forwarded to the storage entity for execution. If either verification step fails, then the command is not forwarded to the storage entity, and optionally some indication of this failure is returned to the user or the operating system.

Other aspects, features, and advantages of the present invention are disclosed in the detailed description that follows.

DETAILED DESCRIPTION OF THE INVENTION

The disclosure of provisional patent application No. 60/079,356 filed Mar. 25, 1998 is hereby incorporated by reference.

Figure 1:
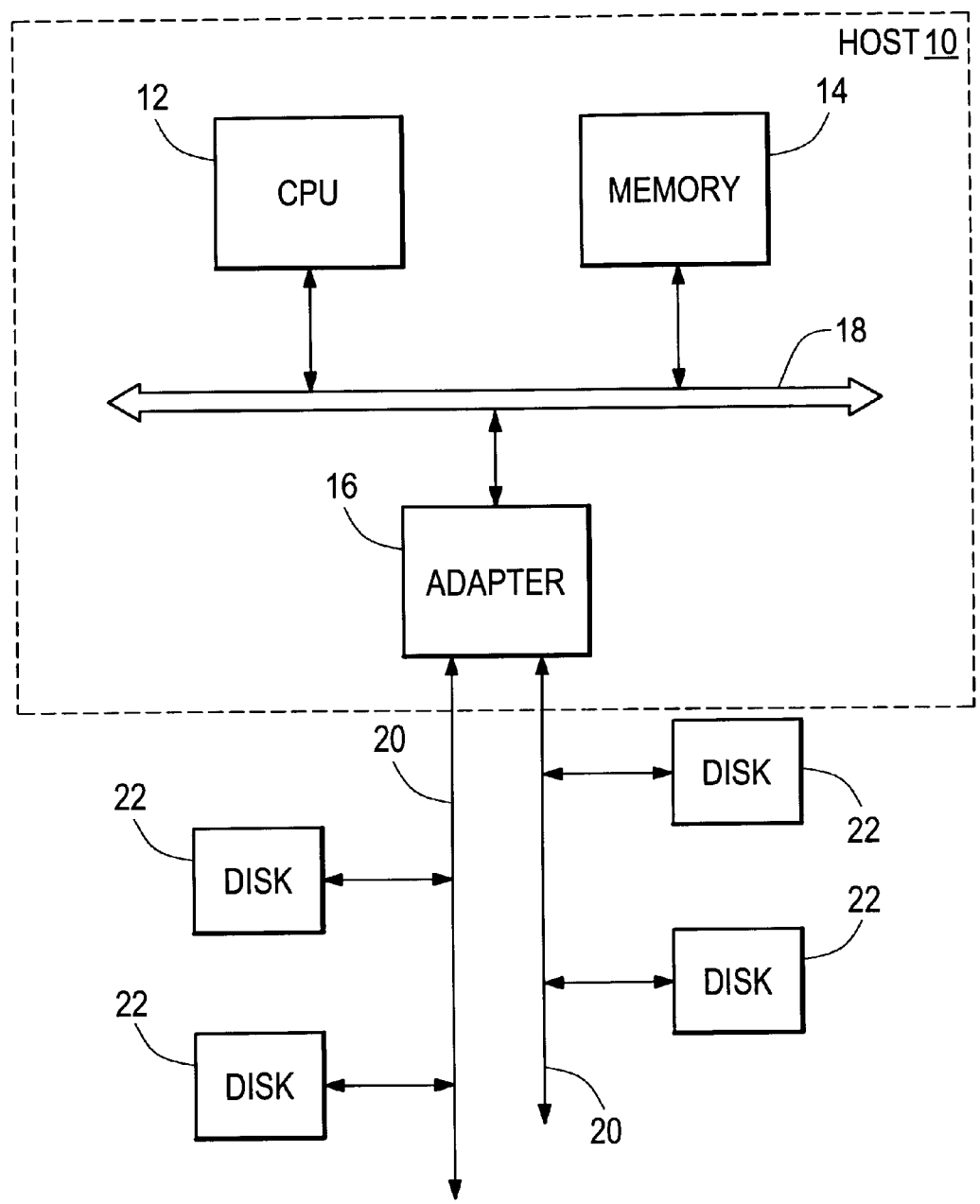
FIG. 1 is a block diagram of a computer system as known in the prior art.

FIG. 1 shows a block diagram of a computer system as is known in the art. A host computer 10, such as a workstation or server computer, includes one or more CPUs 12, system memory 14, and one or more I/O adapters 16, all interconnected by a system bus 18. As is known in the art, the bus 18 may be a single physical bus or may be a collection of multiple interconnected physical busses, such as a memory bus and separate I/O bus.

The adapter 16 is a storage adapter that provides an interface between the system bus 18 and one or more storage busses 20, which may be for example Small Computer System Interconnect (SCSI) busses or other busses used as storage interconnect busses. Attached to each bus 20 are storage devices 22, indicated by the label "disk" in FIG. 1. The storage devices 22 may be disk drives having suitable interfaces to the busses 20, such as for example SCSI-compatible disk drives. Alternatively, the storage devices 22 may also include entire arrays of disks, such as arrays employing RAID (Redundant Array of Inexpensive Disks) techniques.

Figure 2:
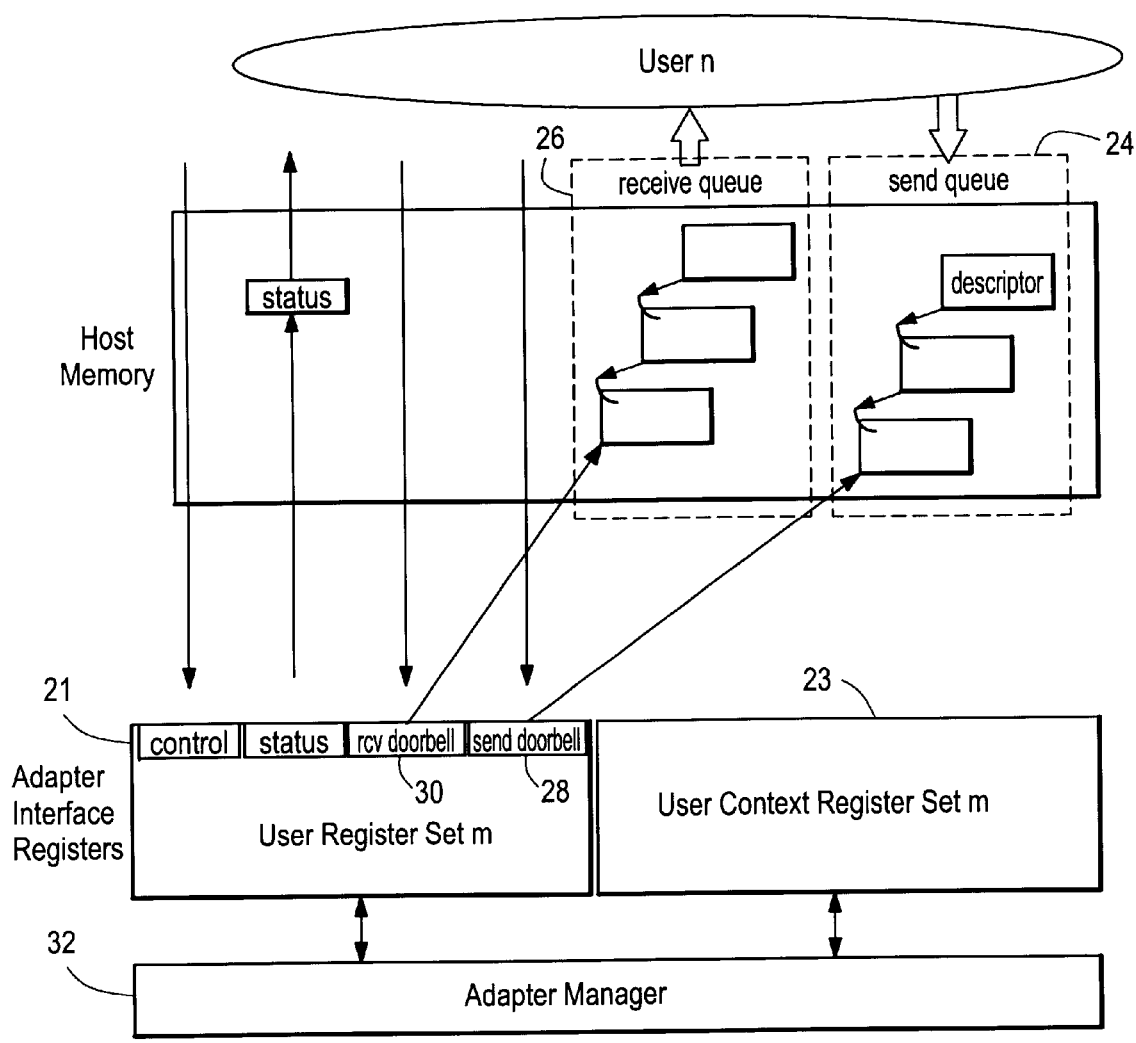
FIG. 2 depicts a software interface to a host bus adapter (referred to as a safe device interface or SDI) in the computer system of FIG. 1 in accordance with the present invention.

FIG. 2 illustrates the structure of a software interface presented to a user application for performing disk I/O in a computer system arranged as in FIG. 1. The interface is referred to both as a "virtual interface" or VI, and as a "safe device interface" or SDI. The interface employs a User Register Set (URS) 21 and an associated User Context Register Set (UCRS) 23. As described below, the adapter 16 of FIG. 1 maintains multiple URS's and the same number of UCRS's in order to support multiple users concurrently. Each URS 21 is mapped into a corresponding region of the memory space of the CPU 12. In particular, each URS 21 is mapped into the address space of the associated user program, and occupies a separate physical memory page. This structure, which is described in more detail below, enables the native memory management mechanism in the computer system to prevent user programs from gaining unauthorized access to other users' registers.

Also shown in FIG. 2 are a Send Queue 24 and a Receive Queue 26 associated with a single user or application program. The Send Queue 24 and the Receive Queue 26 are located in the memory 14 of FIG. 1. Each queue 24 and 26 is a singly linked list of variable-length entries called "descriptors", which are described below. The user posts I/O commands to a device by enqueuing descriptors on the Send Queue 24. The user is notified of the completion of posted I/O requests via the Receive queue 26.

A Send Doorbell register 28 in the User Register Set 21 is associated with the Send Queue 24, and a Receive Doorbell register 30 is associated with the Receive Queue 26. The Send Doorbell register 28 is used by the user program to notify the adapter of the presence of a new descriptor on the Send Queue 24. Similarly, the Receive Doorbell register 30 is used by the adapter to notify the user program of the presence of a new descriptor on the Receive Queue 26. Each doorbell register 28 and 30 contains two values. A Buffer Handle is used to identify a region of memory serving as a data buffer for an I/O request, and an offset value is used to indicate the virtual address of a descriptor queued on the corresponding queue 24 or 26. The use of these values is described in more detail below.

Also associated with each doorbell register 28 and 30, but not shown in FIG. 2, is a corresponding counter that tracks the number of times the doorbell register is written to in between reads. These counters are used to synchronize the writing and reading of descriptors to and from the queues 24 and 26 as described below.

The UCRS 23 contains several data items that are used to reference items of "context" of a user's I/O request, to enable the adapter 16 to verify the request. As described below, the context includes lists of registered memory and disk extents that have been "registered" with the adapter 16. These lists are referred to below as the Context Translation Array-Physical Address (CTA_PA) and the Context Translation Array-Disk Extent (CTA_DE). In the illustrated embodiment, the CTA_PA and CTA_DE are maintained in host memory 16, although in alternative embodiments they may be maintained in memory within the adapter 16. The base address and length of both the CTA_PA and CTA_DE are contained in the UCRS to enable the adapter 16 to access these arrays when verifying an I/O request.

A descriptor is enqueued on the send queue by writing the virtual address of the descriptor and Buffer Handle of the registered virtual memory region that contains the descriptor to the Send Doorbell Register 28, and likewise a descriptor is enqueued on the receive queue by writing the virtual address of the descriptor and Buffer Handle of the registered virtual memory region that contains the descriptor to the Receive Doorbell Register 30. Each time a doorbell register is rung, the associated counter is incremented. When a descriptor has been fetched by the adapter 16, the counter is decremented. Each descriptor has a pointer to the next descriptor on the queue. When the adapter 16 fetches the last descriptor queued, the next field will be a null value.

There is a race between the adapter's fetching the last descriptor and the next descriptor's being linked to the chain of descriptors. If the adapter fetches the last descriptor with a null next pointer and the doorbell is subsequently rung, the adapter must re-fetch the last descriptor if the counter is greater than one. In this situation, the doorbell has been rung more than once, and the pointer to the next descriptor has been overwritten in the doorbell register with subsequent pointers. The re-fetched descriptor will contain a non-null pointer to the next descriptor in the chain. This algorithm allows the doorbell registers to be implemented as a simple register rather than a FIFO.

Also shown in FIG. 2 is an Adapter Manager 32, which is a kernel process executed by the CPU 12 of FIG. 1 that is responsible for controlling the direct access to the adapter 16 by untrusted user programs. The operations of the Adapter Manager 32 are described below.

Figure 3:
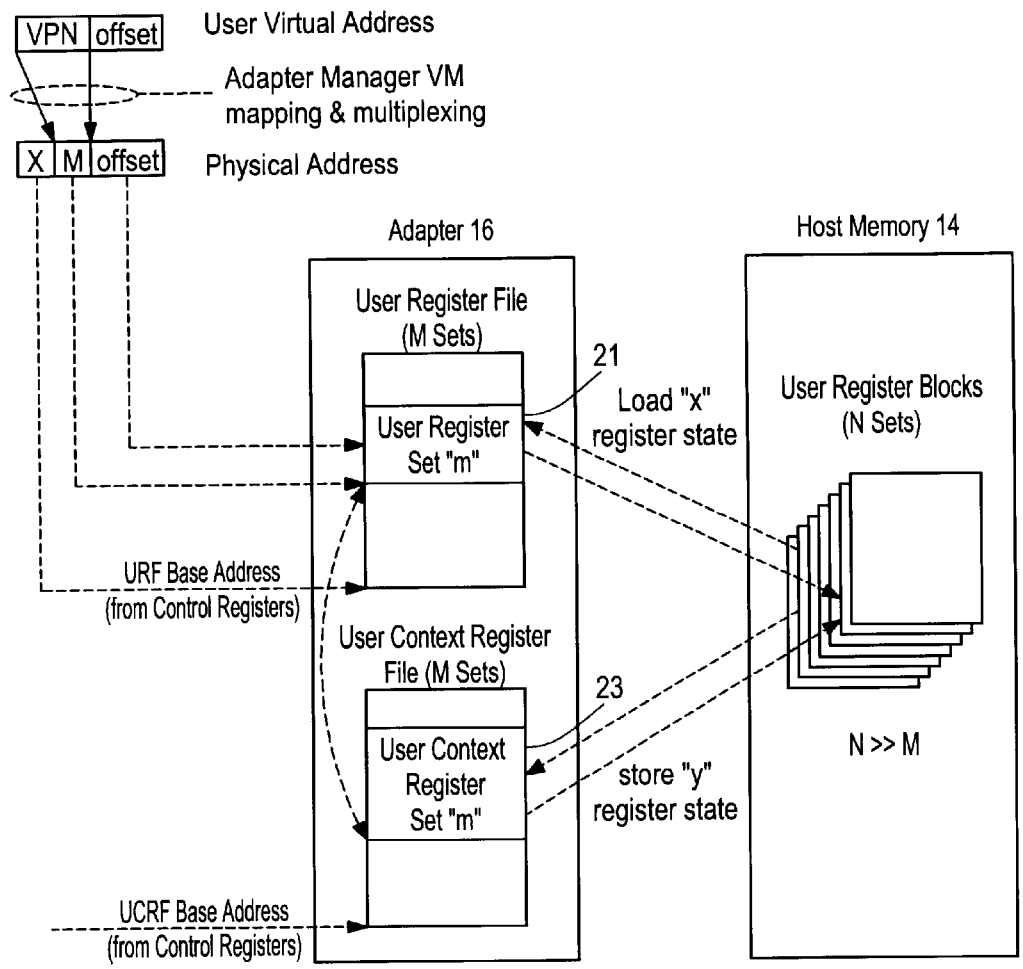
FIG. 3 shows a mapping of register files used in the interface of FIG. 2 to virtual addresses used by an application program and to blocks of registers stored in a host memory in the computer system of FIG. 1.

FIG. 3 shows that the adapter 16 includes a User Register file (URF) and a User Context Register file (UCRF).

The URF contains a number M of User Register Sets (URS's) 21, and the UCRF contains the same number M of User Context Register Sets (UCRS's) 23. At any given time, at most M URS's reside on the adapter 16; these are mapped into the address space of a corresponding user as described below. The Adapter Manager 32 maintains a larger number N of User Register Blocks in host memory 14, each block storing a URS and a UCRS for a corresponding user. The User Register Blocks are allocated in the private address space of the Adapter Manager 16. The URF and UCRF thus contain cached copies of M selected URS's and UCRS's at any given time. The Adapter Manager 32 swaps the URS's and UCRS's between the adapter 16 and the host memory 14 in a manner described below.

As indicated in the upper left corner of FIG. 3, the user's virtual address is mapped to a physical address by a virtual memory mechanism within the Adapter Manager 32, described below. In the physical address, the upper bits "X" are used to select a particular adapter 16, and to indicate whether the URF or UCRF is being accessed. Respective base addresses for the URF and UCRF are programmed into control registers on the adapter 16 for the URF and UCRF, and the upper bits "X" are used to select the appropriate programmed base address depending on which register file is being accessed. The middle bits "M" identify a particular register set (URS or UCRS) within the URF or UCRF as appropriate. The lower bits "OFFSET" identify a particular register within the selected set.

The user has read and write access to any registers within its own User Register Set, and the Adapter Manager 32 has read and write access to the entire User Register File in addition to the User Context Register File. The Adapter Manager 32 performs the following steps to swap URS's and UCRS's between the adapter 16 and host memory 14. These steps are performed when a user, referred to below as a "faulting user", attempts to access a URS that is not presently loaded into the URF:

Idle the faulting user

Select a victim URS/UCRS pair for replacement

Unmap the selected URS/UCRS pair from the victim user

Disable the use of the selected URS/UCRS pair in the adapter

Figure 4:
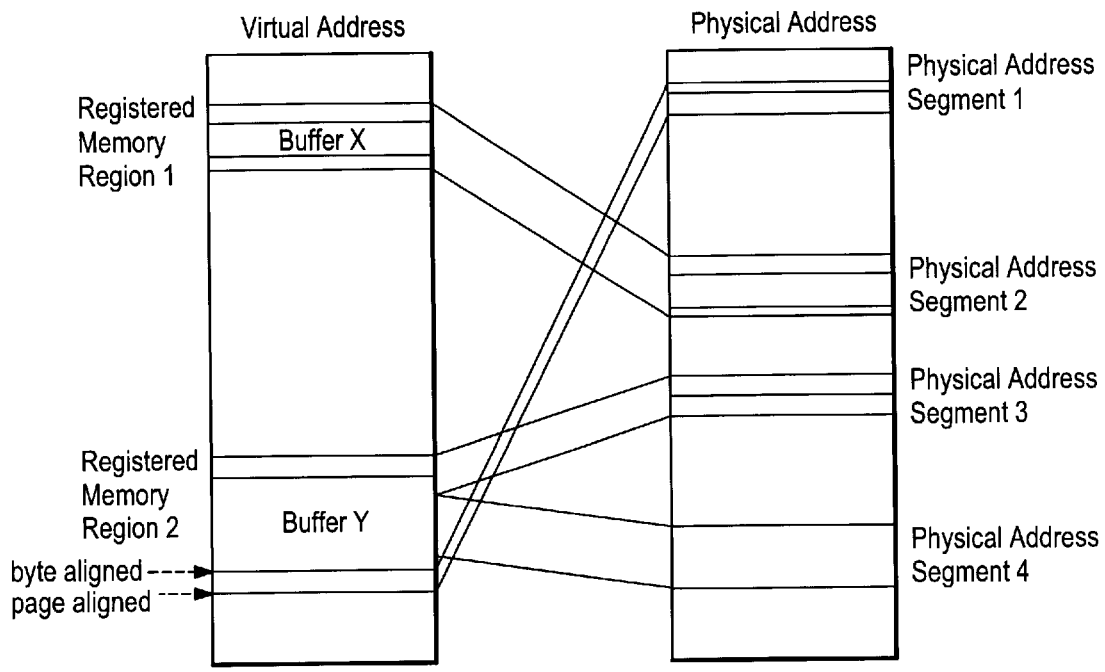
FIG. 4 shows the virtual-to-physical mapping of registered memory associated with the interface of FIG. 2.

Unload the register state from the selected URS/UCRS pair and store in the User Register Block of the victim user Load the register state for the faulting user from the corresponding User Register Block into the selected URS/UCRS pair Map the selected URS/UCRS pair into the new user's address space Enable the use of the selected URS/UCRS pair in the adapter Restart the faulting user Before a user may perform I/O to memory buffers, the virtual memory associated with the buffer must be registered with the Adapter Manager 32. Exemplary buffers are shown in FIG. 4, which shows two virtual memory regions that have been registered with the Adapter Manager 32. Region 1 maps to a single contiguous physical memory segment, physical address segment 2. Region 2 maps to three different physical address segments, segments 1, 3 and 4.

A user registers a memory region by specifying a virtual base address and a length. In response, the Adapter Manager 32 creates an entry in the Context Translation Array-Physical Address (CTA_PA). Each entry in the CTA_PA is known as a Context Translation Entry-Physical Address (CTE_PA). The Adapter Manager 32 returns a Buffer Handle to the user which includes the index of the CTE_PA within the CTA_PA. The use of the Buffer Handle is described below.

Both the Adapter Manager 32 and the adapter 16 have read/write access to the CTA_PA. The adapter 16 reads CTE_PA entries when verifying addresses associated with descriptors, as described below. The Adapter Manager 32 writes CTE_PA entries when they are created, and reads them when managing the CTA_PA. A DISABLE function is used to enforce synchronization between the Adapter Manager 32 and the adapter 16. Before updating a CTE_PA, the Adapter Manager 32 issues a DISABLE(m) command identifying a context "m" to the adapter 16. This prevents the adapter from using any CTE associated with the disabled context until the Adapter Manager 32 issues an ENABLE (m) command to re-enable the context.

Figure 5:
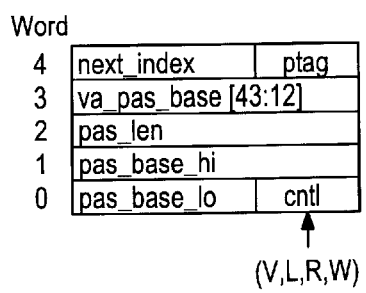
FIG. 5 shows an entry in a table used to perform the virtual-to-physical mapping of FIG. 4.

The structure of a CTE_PA is shown in FIG. 5. Each CTE_PA contains five 32-bit words, labeled words 0 through 4. The base physical address (PAS_BASE) of a physical address segment (PAS) is a 64 bit address assumed to be aligned to a host page boundary. As shown, PAS_BASE is stored in words 0 and 1 of the CTE_PA.

Word 0 also contains several control bits as follows:

A Valid bit V indicating whether the contents are valid.

A Link bit L used to chain multiple CTE_PAs together for a contiguous virtual memory region that maps to non-contiguous physical memory regions(e.g. region 2 in FIG. 4).

A Referenced bit R used to monitor the use of the page, for example by replacement algorithms.

A Write Enable bit W indicating whether the user has write privileges to the PAS.

A 20 bit length value PAS LEN is stored in the upper part of word 2. PAS_LEN is the length of the segment in pages.

Word 3 contains a value VA_PAS_BASE[43:12], which contains bits [43:12] of the base virtual address of the registered memory region. This value is used as described below to generate an offset into the registered memory region during an I/O operation.

The low 16 bits of Word 4 of the CTE_PA contain a 16 bit Protection Tag or PTAG. Each PTAG is associated with a Virtual Interface or VI, which is described below. When a descriptor is queued on a VI, the adapter verifies that the PTAG in the VI matches the PTAG in the CTE_PA that maps the user buffer identified in the descriptor. This mechanism permits selective sharing of memory segments between a user application and an I/O device.

The high 16 bits of Word 4 contain a NEXT_INDEX field. If the Link bit is set, the NEXT_INDEX field points to the next CTE_PA in a chain that describes a single registered memory region. The 16-bit field size imposes a limit of 64K on the size of the CTA_PA. However, since each CTE_PA may describe up to 4 Gbytes of memory, this limitation is not problematic for current or foreseeable applications. In any event, in alternative embodiments this field can be made larger if desired.

Figure 6:
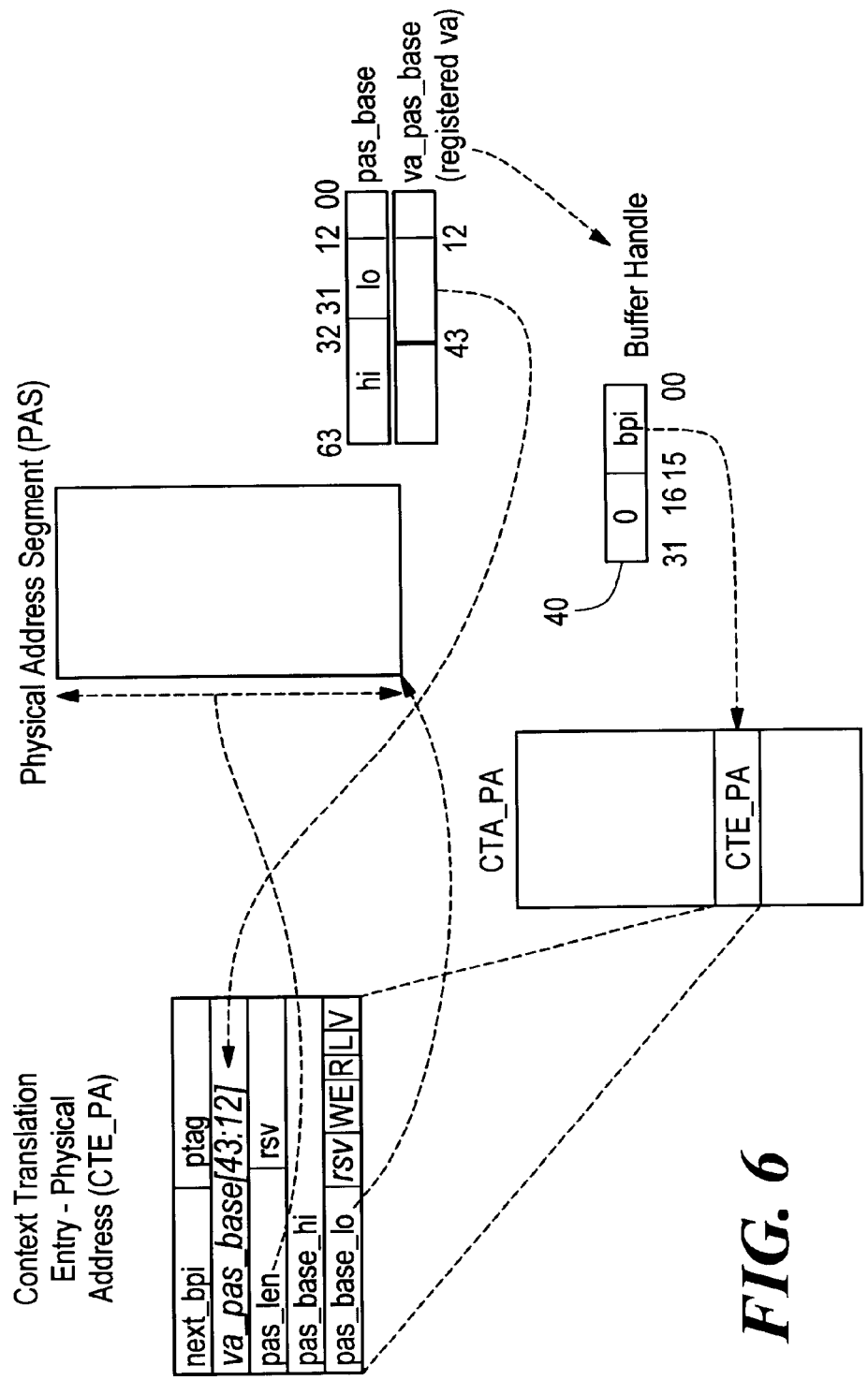
FIG. 6 shows the manner in which the table entry of FIG. 5 is used to identify a segment of physical memory from a registered virtual address.

FIG. 6 illustrates the use of the CTE_PA in obtaining data from a PAS. The Buffer Handle 40 is a pointer to the registered virtual memory region, and is used for all subsequent data transfer operations to the region as described below. The low-order 16 bits of the Buffer Handle 40 contain an index BPI that points to the CTE PA that contains the first (and perhaps only) PAS that maps the registered virtual memory region.

The Buffer Handle is passed to the adapter 16 in a descriptor, which is described below. Subject to a verification procedure also described below, the Buffer Handle is used to retrieve a CTE_PA from the CTA_PA. The PAS_BASE in the CTE_PA points to the base physical address of a physical address segment. Bits [43:12] of a user virtual address appearing in the descriptor are subtracted from VA_PAS_BASE[43:12] to generate an offset into the registered memory region, identifying a particular page. The low-order bits of the user virtual address are then used to index into the page to identify a particular memory location.

The adapter 16 carries out the following steps to verify whether a user has permission to use a user-specified region of memory to perform an I/O operation:

1. Verify that the value of the index BPI is no greater than the number of entries in CTA_PA
2. Verify that the V bit of the CTE_PA pointed to by BPI is set.
3. Calculate a physical address offset by subtracting VA_PAS_BASE[43:12] from bits [43:12] of the virtual address in the descriptor.
4. Compare the PTAG of the CTE_PA with the PTAG in the descriptor.
5. Verify that the calculated offset is less than the length of the PAS as indicated in the CTE_PA.
6. Verify that sum of the calculated offset and the length contained in the descriptor is less than the length of the PAS as indicated in the CTE_PA.
7. If either of steps 5 or 6 fails but the L bit in the CTE_PA is set, then repeat the verification steps on the next CTE_PA in the chain, which is pointed to by the NEXT_INDEX value in the CTE_PA.

The segment-based translation and protection mechanism described above is targeted towards dedicated server applications such as databases or embedded applications that usually control the majority of the resources of the server. In this environment, most of the physical memory may be dedicated to the application program, so that physically contiguous buffer segments are provided to the application. For example, a large database buffer cache may be registered with a single CTE_PA that describes a four gigabyte physically contiguous memory region.

However, for general purpose, dynamic environments with multiple applications and users, it may be difficult to allocate and register physically contiguous memory regions to users. Consequently, a user may access a registered memory region with an offset that requires the adapter to fetch and de-reference multiple CTE_PA.next_index pointers to fetch the required CTE_PA entry, resulting in an undesirable performance penalty.

Two mechanisms can be used to improve performance in environments that cannot rely on registered memory being physically contiguous. One mechanism uses a memory management unit to modify the original Buffer Handle passed in the descriptor to point directly to the CTE_PA that describes the virtual address in the descriptor. The other mechanism employs page based CTE_PA entries to allow direct indexing of the CTA by the unmodified buffer handle.

There are three granularity levels for enabling page based versus segment based address translation and protection:

1) per adapter
2) per User Context (UC)
3) per descriptor

When page based address translation and protection is enabled, the CTE_PA.PAS.base address is a physical page address. CTE_PA.PAS.length is set to zero to indicate a length of one page. CTE_PA.next_index, CTE_PA.va_pas_base, and CTE_PA.Lbit are all set to zero.

When page based address translation and protection is to be enabled on an individual user context basis, each User Context is separately enabled for page based address translation and protection by setting an enable bit in a Context Mode Register of the relevant UCRS.

The adapter uses page based address translation and protection on a per descriptor basis if the MSB (bit 31) of the Buffer Handle is set. If the MSB of the Buffer Handle is clear, then segment based address translation and protection is used.

Figure 7:
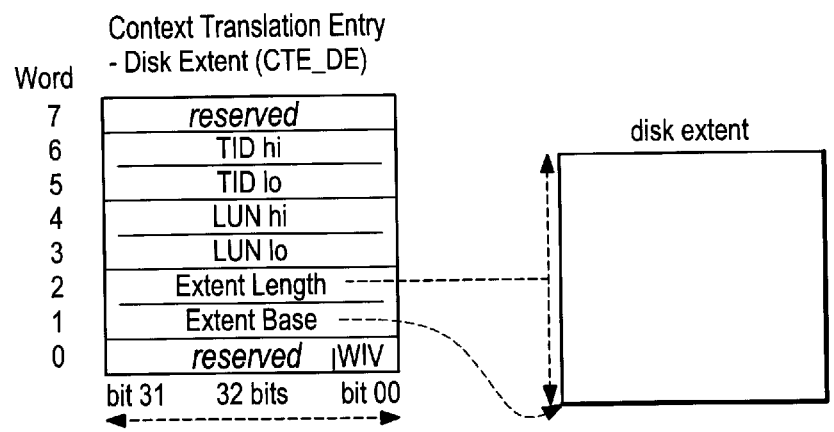
FIG. 7 shows an entry in a table used to describe a registered extent of a storage device associated with the interface of FIG. 2.

FIG. 7 shows the structure of a Context Translation Entry-Disk Extent (CTA_DE), which is a record of a registered disk extent that is used for verification purposes as described below. The CTA_DE includes an Extent Base address and an Extent Length value, which together identify a region on a disk. The CTA_DE also contains a Logical Unit Number or LUN, and a Target ID number or TID. The TID and LUN are values used in storage protocols such as SCSI and Fibre Channel to identify a particular disk and, if applicable, a particular "logical unit" (such as a partition) within a disk.

Figure 8:
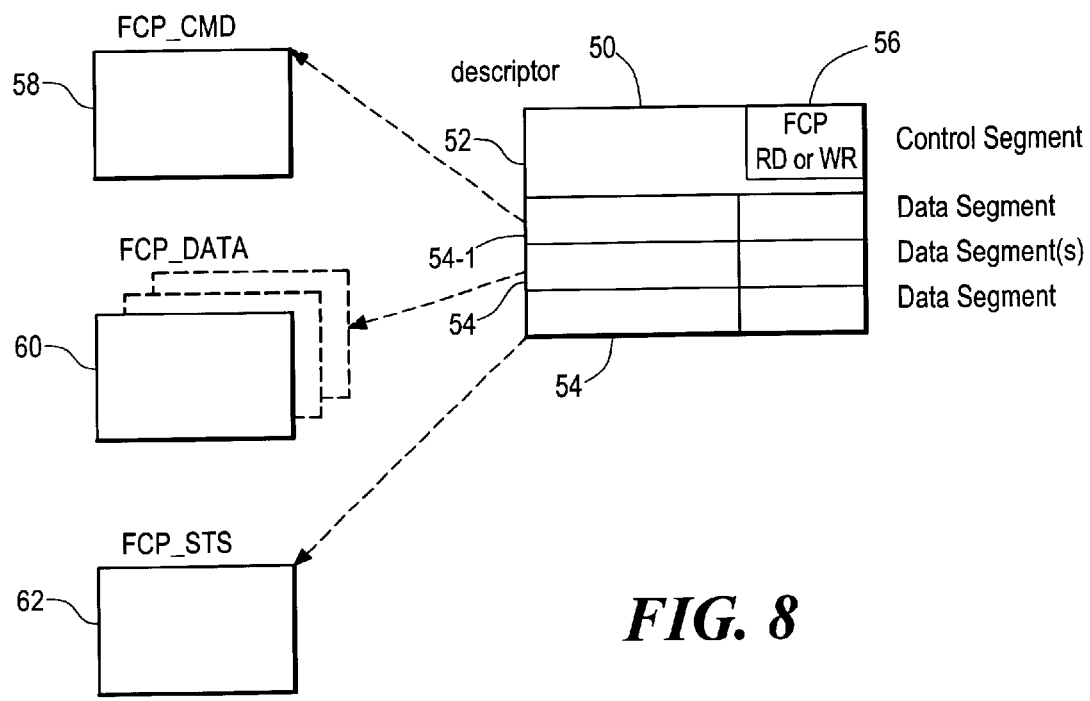
FIG. 8 illustrates the use of a descriptor to identify buffers for storing an I/O command and data buffers for storing data being transferred to or from a storage device.

FIG. 8 shows how a command is sent to the adapter 16 using a descriptor 50. In the illustrated case, the command is formatted in a known manner as a Fibre Channel Protocol (FCP) command. The descriptor 50 contains a control segment 52 and data segments 54. The control segment 52 contains a control field 56 that indicates the type of I/O operation to be performed, such as a Read or Write. The first data segment 54-1 points to a buffer 58 containing the FCP command. One or more additional data segments 54 point to buffers 60 for the read or write data. The last data segment 54 points to a buffer 62 for the status buffer FCP_STS.

Figure 9:
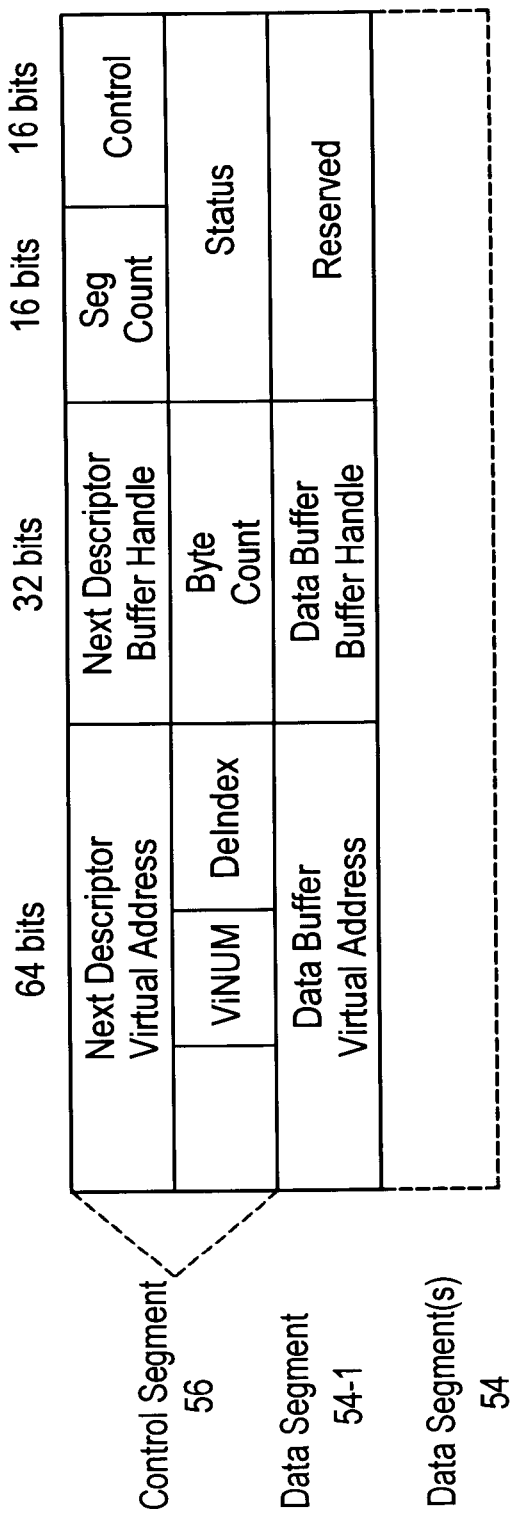
FIG. 9 shows the structure of a control segment in the descriptor of FIG. 8.

FIG. 9 shows the structure of the control segment 56 within the descriptor 50. It contains a Control field indicating the type of command, such as read or write, and a Segment Count indicating the size of the descriptor 50. The Next Descriptor Buffer Handle and Next Descriptor Virtual Address are links to the next descriptor 50 in the queue.

The descriptor 50 also contains the Device Extent Index or DeIndex, which is also referred to as the Extent Handle. A Virtual Interface Number ViNum is used to enable support for multiple VI's per queue, if that functionality is desired in a particular system.

Figure 10:
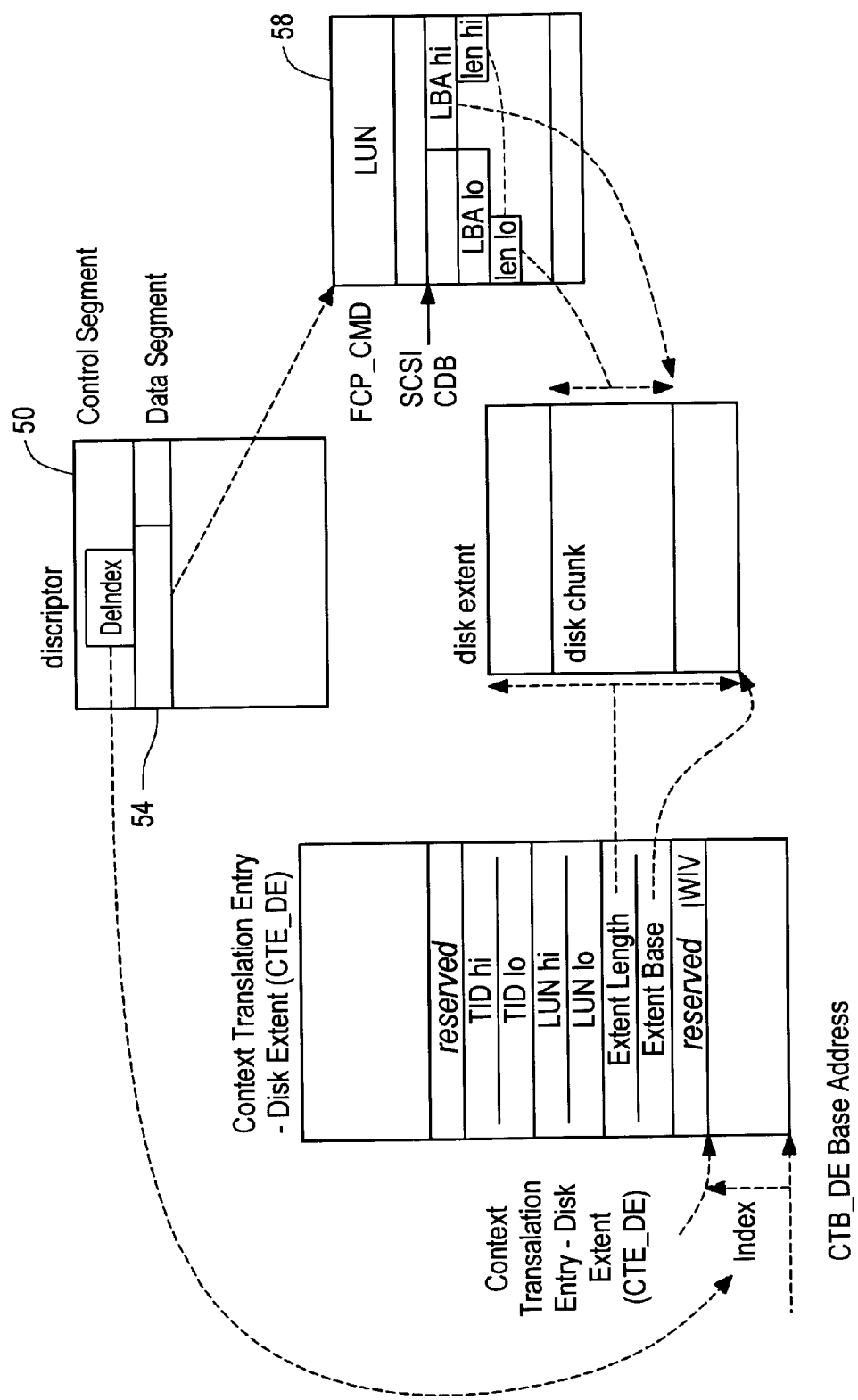
FIG. 10 is a schematic illustration of a process for verifying that an area of a disk to be accessed by the command of FIG. 8 is within an extent registered in the manner of FIG. 7.

FIG. 10 illustrates how it is verified that a user has access rights to a disk area identified in a disk read or write command. The extent handle DeIndex from the descriptor 50 points to the CTE_DE for the extent being accessed. As previously indicated, the CTE_DE contains the base address and length of the registered extent. The first data segment 54 in the descriptor 50 points to the command buffer 58.

The following checks are performed:
1. Whether the value of DeIndex is less than the number of entries in the CTA_DE.
2. Whether the CTE_DE pointed to by DeIndex is valid.
3. Whether the logical unit numbers (LUNs) from the CTE_DE and the command buffer 58 match.
4. Whether the logical block address (LBA) from the command buffer 58 is within the extent mapped by the CTE_DE.
5. Whether the sum of the LBA and the length from the command buffer 58 is within the extent mapped by the CTE_DE.
6. If the command is a write, whether the W bit in the CTE_DE is set.

In addition, it is verified whether the command buffer 58 is itself "well formed". For example, in the case of an FCP command having a particular known format, the various pieces within the buffer 58 are examined to ensure that they comply with the known format of an FCP command. This includes checking a so-called SCSI Command Descriptor Block or CDB, which also has a known format, to ensure that it is likewise well formed.

Although the foregoing description shows particular structure and methods, there may be other structure and methods that can be employed within the scope of the present invention. The technique may be used with storage entities other than disk drives. It may be used, for example, with network file servers or similar remote storage services. The registration of memory and extents need not be done directly by the user in advance of an I/O request. Also, it is not strictly necessary that the user identify registered extents by passing a buffer handle or extent handle in the descriptor. Other mechanisms can be employed for registering memory and extents and for identifying them during the verification process.

The precise structure of data items may be varied to suit particular environments or design objectives. For example, although in the illustrated embodiment the I/O command resides in a buffer pointed to by a descriptor 50, it may be desirable in alternative embodiments to include the command within the descriptor itself. Also, different mechanisms may be used to pass descriptors between the user program and the adapter 16. It may also be advantageous in alternative embodiments to verify a user's access to memory and disk extents in different ways.

It will be apparent to those skilled in the art that other modifications to and variations of the above-described technique are possible without departing from the inventive concepts disclosed herein. Accordingly, the invention should be viewed as limited solely by the scope and spirit of the appended claims.

What is claimed is:

1. A method of accessing storage from an untrusted application program executing in a computer system, comprising:

in a trusted process in the computer system, creating a private interface between the application program and a storage entity allocated for use by the application program, the interface having associated therewith (i) storage entity identification information identifying the storage entity, and (ii) a command data structure operative to receive storage access commands from the application program for accessing the storage entity, the command data structure and private interface being usable by the application program and not usable by other application programs executing in the computer system;

in the application program, (i) creating a storage access command containing command information identifying a storage access operation to be performed with respect to the storage entity, and (ii) posting the storage access command to the command data structure; and in a process other than the trusted process and the application program, (i) monitoring the command data structure for the presence of storage access commands posted thereto, and (ii) upon encountering the storage access command posted by the application program, accessing the storage entity as specified by the command information contained therein.

2. A method according to claim 1, further comprising in the application program, creating a data buffer in memory within the computer system, the data buffer being allocated for storing data to be written to or read from the storage entity during the storage access operation, and the data buffer being identified by buffer information in the storage access command, and wherein accessing the storage entity comprises transferring data between the data buffer and the storage entity.

3. A method according to claim 1, wherein the interface also has associated therewith a response data structure via which results of storage access operations are provided to the application program, and further comprising upon the completion of the storage access operation, posting a response to the response data structure of the interface, the response identifying a result from the accessing of the storage entity in response to the posted storage access command.

4. A method according to claim 1, wherein the storage entity is a disk extent.

5. A method according to claim 4, wherein the storage access command includes address and length information identifying a contiguous portion of the disk extent, and wherein accessing the storage entity includes accessing the contiguous portion of the disk extent.

6. A method according to claim 1, wherein the command data structure resides in memory within the computer system allocated for use by the application program, and wherein the use of the command data structure by the application program and the non-use of the command data structure by the other application programs is ensured by a memory management function within the computer system.

* * * * *

UNITED STATES PATENT AND TRADEMARK OFFICE
CERTIFICATE OF CORRECTION

PATENT NO.     : 6,751,680 B2
DATED          : June 15, 2004
INVENTOR(S)    : Alan B. Langerman et al.

It is certified that error appears in the above-identified patent and that said Letters Patent is hereby corrected as shown below:

Column 7,
Line 5, "PAS LEN" should read -- PAS_LEN --.

Signed and Sealed this

Fifth Day of July, 2005

JON W. DUDAS
*Director of the United States Patent and Trademark Office*